(12) United States Patent
Ostergren

(10) Patent No.: US 9,097,271 B2
(45) Date of Patent: Aug. 4, 2015

(54) FASTENER FOR AIR-BAG CURTAIN

(75) Inventor: Kristian Albert Ostergren, Alingsas (SE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 13/263,226

(22) PCT Filed: Mar. 31, 2010

(86) PCT No.: PCT/SE2010/050365
§ 371 (c)(1),
(2), (4) Date: Oct. 6, 2011

(87) PCT Pub. No.: WO2010/117322
PCT Pub. Date: Oct. 14, 2010

(65) Prior Publication Data
US 2012/0039687 A1    Feb. 16, 2012

(30) Foreign Application Priority Data

Apr. 6, 2009 (SE) ........................ 0950222

(51) Int. Cl.
*F16B 21/02* (2006.01)
*B60R 21/20* (2011.01)
*B60R 21/213* (2011.01)

(52) U.S. Cl.
CPC ............... *F16B 21/02* (2013.01); *B60R 21/213* (2013.01)

(58) Field of Classification Search
USPC ................. 411/1, 8, 9, 390, 903, 349, 552; 280/728.2
See application file for complete search history.

(56) References Cited

U.S. PATENT DOCUMENTS

| | | | | |
|---|---|---|---|---|
| 1,360,880 A | * | 11/1920 | Buchholtz | 40/200 |
| 2,610,379 A | * | 9/1952 | Bugg | 411/349 |
| 2,635,918 A | * | 4/1953 | Muckle | 296/213 |
| 3,085,461 A | * | 4/1963 | Forman | 411/403 |
| 3,434,095 A | * | 3/1969 | Derose | 439/47 |
| 5,316,167 A | * | 5/1994 | Kay | 220/328 |

(Continued)

FOREIGN PATENT DOCUMENTS

DE    102007048951 A1    4/2009
EP        1422112 A1    5/2004
(Continued)

OTHER PUBLICATIONS

ISR for PCT/SE2010/050365 dated Jun. 8, 2010.

*Primary Examiner* — Flemming Saether
(74) *Attorney, Agent, or Firm* — Lowe Hauptman & Ham LLP

(57) ABSTRACT

The invention relates to a fastener and a fastening system for fixing a curtain airbag in a vehicle. The fastener is fixed to a mounting hole in a body frame or the like of the vehicle by inserting an attachment portion of the fastener into the mounting hole while a head portion securing the attachment of the airbag curtain to the fastener and the vehicle. The fastener comprises a first load bearing structure adapted to maintain its shape when the airbag curtain is activated and a second energy absorbing structure adapted to deform when the airbag curtain is activated. The advantages by such a fastener is that the energy absorbing structure of the fastener will absorb a part of the energy from the forces working on the structure comprising the attachment holes such that there is less stress and damages to the attachment site and less risk for detachment of the airbag curtain.

16 Claims, 4 Drawing Sheets

(56) References Cited

U.S. PATENT DOCUMENTS

| | | | | |
|---|---|---|---|---|
| 5,518,350 | A | * | 5/1996 | Kyprios .................. 411/343 |
| 5,810,535 | A | * | 9/1998 | Fleckenstein et al. ........ 411/522 |
| 6,234,515 | B1 | * | 5/2001 | Iwanaga .................. 280/728.2 |
| 6,565,116 | B1 | * | 5/2003 | Tajima et al. .............. 280/730.2 |
| 7,210,886 | B2 | | 5/2007 | Kawai et al. |
| 7,216,891 | B2 | | 5/2007 | Biglino |
| 7,261,315 | B2 | | 8/2007 | Hofmann et al. |
| 7,340,808 | B2 | * | 3/2008 | Baekelandt .................. 24/453 |
| 7,374,200 | B2 | * | 5/2008 | Ikeda et al. ............... 280/728.2 |
| 7,523,959 | B2 | | 4/2009 | Kawai et al. |
| 2007/0296184 | A1 | | 12/2007 | Oestergren |
| 2008/0014045 | A1 | | 1/2008 | Kawai |

FOREIGN PATENT DOCUMENTS

| | | |
|---|---|---|
| EP | 1502824 A1 | 2/2005 |
| EP | 1522466 A1 | 4/2005 |
| EP | 1857333 A2 | 11/2007 |
| EP | 1878925 A2 | 1/2008 |
| FR | 2818706 A1 | 6/2002 |
| GB | 2364975 A | 2/2002 |
| WO | 2008099243 A1 | 8/2008 |

\* cited by examiner

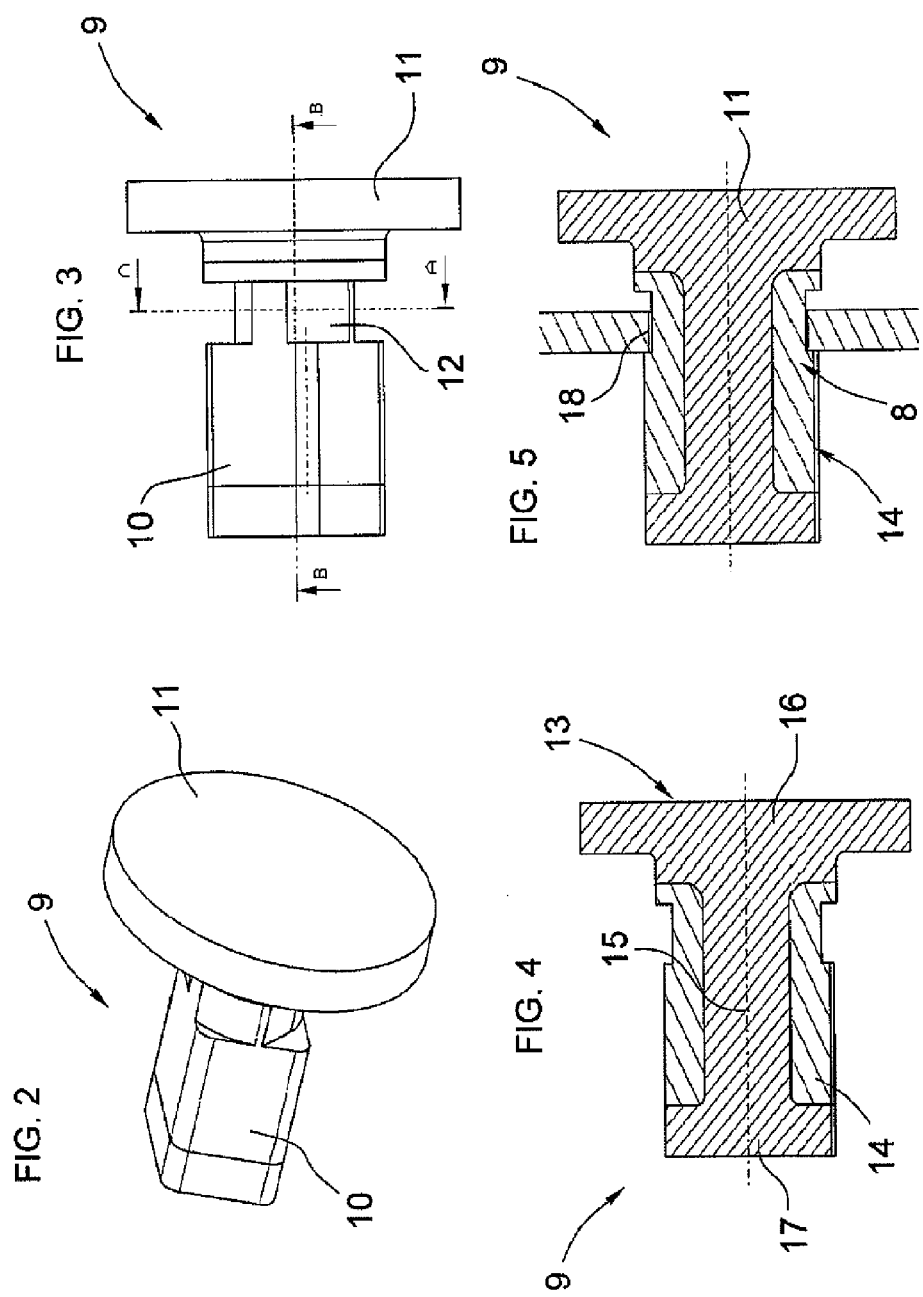

FASTENER FOR AIR-BAG CURTAIN

RELATED APPLICATIONS

The present application is national phase of PCT/SE2010/050365 filed Mar. 31, 2010, and claims priority from Swedish Application Number 0950222-0 filed Apr. 6, 2009.

TECHNICAL FIELD

The invention relates to a fastener and a fastening system for fixing a curtain airbag to a body panel in a vehicle.

BACKGROUND ART

In vehicles, such as personal cars, it is common practice today to include an airbag curtain. These airbag curtains may for example be attached at the inside of the vehicle at the side panels near the roof. In case of an accident, the curtains are adapted to be activated and thus form a safe guard against hitting the hard parts of the vehicle. In case of a curtain located at the side, its main purpose is to protect the driver or the occupants, in particular in the event of a side impact, from hitting the side panels and the side windows.

When the curtains are activated, there is large force acting on the fastener of the curtain and the panel to which it is attached. In order to be able to securely fasten the curtain to the vehicle, or the vehicle panels, it is needed to make the fastener enough robust to withstand the forces developed at activation of the curtain.

In EP 1 422 112 is described a fastener for an airbag curtain. According to this fastening system, the airbag is provided with an anchor portion which is attached to a side panel of the car by means of fasteners. Each fastener squeezes the anchor portion between the panel and a flange of the fastener when the curtain is attached to the panel. The fastener is securely attached by means of a tapping screw driven into a shank when the fastener is inserted in a mounting hole.

There are further solutions of fastening an airbag curtain to a panel described in for example EP 1 522 466, EP 1 502 824 and GB 2 364 975 which describes related art to which the present invention is directed.

A further fastener suitable for airbag curtains is described in EP 1 857 333. wherein the fastener described is made of a polymeric material.

Even though the above described fasteners provide solutions for attachment of airbag curtains, there is still a need to improve the attachment of these fasteners due to the large forces associated with the activation of the airbag curtain.

DISCLOSURE OF INVENTION

The theory beyond the present invention is based on studies and experiments of the attachment of airbag curtains when they are activated. These studies have shown that it is not only the strength of the clip or fastener itself which is essential but also the strength of the attachment point, i.e. the interaction of the fastener and a mounting hole to which the fastener is attached. There are a wide variety of different attachment points which may be used, e.g. thin metal plates used for the bodywork or body panel of a vehicle or rather robust constructive parts such as load bearing pillars of the framework of the vehicle. The use of metal plates, forming the bodywork of the vehicle, as attachment points have the disadvantage that the metal plate may be very thin, e.g. down to 0.5 mm, and thus not are able to withstand large forces. Concerning more rigid structures, they are usually not available at all desired locations where an attachment is needed. In addition, if these structures are used as attachment points, it may be hard to produce an attachment hole in these structures and the making of such a hole may have an undesired, weakening effect on the load bearing structure.

A possible solution to the problem of providing an appropriate fastening of an airbag curtain could be to add an extra pillar or modify existing structures to be appropriate for the attachment of airbag curtains, e.g. the use of thicker metal plates. However, such a solution implies a costly modification of the existing structure. Hence, the present invention is based on the insight that there is a need of adapting the attachment of airbag curtains to the vehicle structure to withstand the large forces during activation of the airbag curtain without making particular adaptations of the vehicle load bearing structures or bodywork.

The present invention according to claim 1 aims to provide a solution for the attachment of airbag curtains to a vehicle.

Hence, such a fastener for attachment of an airbag curtain to a vehicle is disclosed in claim 1. The fastener is intended to be fixed to a mounting hole in a body work, body frame, body panel or the like of the vehicle. The fastener comprises an attachment portion intended to be inserted into the mounting hole and a head portion in order to secure the attachment of the airbag curtain to the fastener. The head portion and the attachment portions are attached to each other either directly or by an intermediate structure. The head portion of the fastener may be shaped as desired such that a reliable connection to an attachment portion of the airbag or to an intermediate connection between the airbag curtain and the fastener is secured. The fastener further comprises a first load bearing structure adapted to maintain its shape when the airbag curtain is activated and a second energy absorbing structure adapted to deform when the airbag curtain is activated. By the expression that the load bearing structure is adapted to maintain its shape is meant that the structure shall maintain its shape to such a degree that it will not by being deformed so as to detach from the mounting hole. Hence, the shape of the load bearing structure shall be essentially maintained when subjected to forces even though it may be slightly bent or otherwise receiving minor deformations.

When the airbag curtain is activated, an inflator is activated such that the airbag curtain will inflate and deploy. The inflation of the airbag curtain will cause large forces acting on the attachment due to the fast inflation of the airbag curtain in order to be deployed fast enough to protect a passenger/driver in the vehicle in the case of an accident. Hence, the forces will work on the fastener which in turn will work on the body frame or the like structure wherein the fastener is attached to the vehicle. In case the attachment holes are made in a body work of metal plates, in particular if the plates are thin, there is a risk that the forces form the deployment of the airbag, via the fastener, will cause damages to the mounting hole and the plate surrounding the attachment holes and in worse case the fastener may detach such that the airbag curtain will not stay in its desired, protective position. The fastener according to the present invention will make the forces working on the structure comprising the attachment holes to cause less stress and damages to the attachment site by absorbing a part of the impact energy by the second energy absorbing structure of the fastener. If the forces on the fastener are of such a magnitude that the possible deformation of the second, energy absorbing structure is complete, i.e. when there is no possibility for further deformation of the energy absorbing structure, forces from the first, load bearing structure will start to work on the attachment hole. However, the total amount of forces working on the attachment point will be lowered and the attachment point will be able to better withstand the forces and avoid undesired damages to the attachment hole and the surrounding plate. The design and material choice for the fastener depends on several factors such as the geometry of the mounting hole, the physical properties of the material wherein the hole is made and the magnitude and direction of forces working on the fastener and fasteners may thus be adapted for particular conditions.

The fastener may be produced such that the first, load bearing structure of the fastener is made of a first material and the second energy absorbing structure of the fastener is made of a second material different from the first material. Hence, the material intended to be used for the load bearing structure of the fastener shall be sufficiently strong and stiff such that the load bearing structure not run the risk of breaking or being deformed to such an extent that the fastener may slip out of the attachment hole when the air bag curtain is activated and deploys. The material for the second, energy absorbing structure shall be soft enough such that the energy absorbing structure will be modified during energy absorption in association with deployment of the air bag curtain. However, the energy absorbing structure should also preferably be rigid enough in order to absorb a substantial amount of the energy when the air bag curtain deploys such that the peak forces working on the mounting hole and the area surrounding the mounting hole will be low enough so as to prevent a substantial deformation of the hole which may cause the fastener to slip through the hole and release the air bag curtain from its attachment point.

The material for the first load bearing structure and the second, energy absorbing structure may be selected such that the first material, to be used for the load bearing structure, may have a modulus of elasticity, when tested according to ISO 527, which is higher than the modulus of elasticity of the material used for the second energy absorbing structure. The difference between the modulus of elasticity (when tested according to ISO 527) may be at least 3 times higher, more preferably at least 5 times and most preferably 10 times higher for the material used for the load bearing structure than for the energy absorbing structure. Suitable material for the load bearing structure may for example be steel having an elasticity module of 193,000 MPa or zinc having an elasticity module of 85,000. The energy absorbing material may for example be PC/ABS, a plastic material having an elasticity module of 2,200 MPa.

As described above, the material for the load bearing structure may comprise a metal and may either be an alloy or a pure metal, e.g. iron, zinc or alloys comprising any of these or other metals. In general, it is hard to find plastics or polymers which are sufficiently strong (stiff) to form the load bearing structure. A strong plastic material which may be used is PA 66 with reinforcing carbon fibres having an elasticity module of 28,000 MPa. The elasticity module of the material for the load bearing structure is preferably at least 20,000 MPa. As is obvious to the skilled person, the ability of the load bearing structure of a fastener to withstand the forces associated with a deployment of an air bag curtain without breaking is, in addition to the properties of the material used, strongly dependent on dimensions, shape and the direction and magnitude of the forces from the curtain when deploying. Hence, depending on the dimensions of the fastener different material may be suitable and any material forming the load bearing structure without breaking when subjected to the forces associated with the deployment of the air bag curtain may be used.

The energy absorbing material may comprises a polymer or plastic material which may be deformed plastically or elastically. In general, the elasticity module of the energy absorbing material is between 500 and 10,000 MPa The fastener may be constructed such that the load bearing structure forms a core structure along the longitudinal axis of the fastener, i.e. the axis of the fastener in the insertion direction from the attachment portion to the head portion of the fastener, which at least partially is surrounded by a shell structure forming part of the energy absorbing structure.

The load bearing structure may be constructed such that it comprises a first enlarged head portion forming part of the head portion of the fastener. The load bearing structure preferably comprises this feature in order to assure that the head portion of the fastener not may break. The fastener may also comprise a second enlarged (head) portion forming part of the attachment portion of the fastener. The function of this enlarged portion of the load bearing structure is to prevent that the fastener is withdrawn out of the hole when there are forces striving to withdraw the fastener, i.e. in the case of activation of an airbag curtain attached to the fastener. The enlarged portion is preferably located at the distal end of the attachment portion, i.e. the end of the attachment portion furthest away from the head portion of the fastener. By this arrangement will the energy absorbing structure be able to absorb a part of the impact energy while deformed before there is a definite stop of the fasteners motion when the enlarged head portion of the attachment portion of the load bearing structure reaches the edges of the attachment hole. The load bearing portion may also comprise an interconnecting part connecting the first and second enlarged head portions of the load bearing structure such that these part not may detach from each other and assure the fasteners function.

As described above, the energy absorbing structure has been exemplified by the use of materials having a different (lower) modulus of elasticity than the load bearing structure. In this case, the general idea is to use a solid piece of material as the energy absorbing structure which is modified while absorbing energy when subjected to strong forces. However, the energy absorbing structure may also be made as a frame work structure adapted to collapse when subjected to strong forces. In this case the material for the energy absorbing structure may have a considerably higher modulus of elasticity and the load bearing structure and energy absorbing structure may be made of the same material.

The fastener may be constructed such that the attachment portion adapted to be inserted into the mounting hole has a geometry allowing the attachment portion to fit into and be inserted into the mounting hole when the fastener is positioned in a first, insertion position. The geometry of the fastener further allows the fastener to be rotated when inserted in the mounting hole to be positioned in a second, attachment position in which the attachment portion is prevented from being able to be withdrawn out of the attachment hole. Hence, a fastening system for a fastener as described herein is provided in which the attachment holes and the attachment portion are adapted to each other such that the fastener fits into the hole when it is located in the first, attachment position while the fastener may be rotated when inserted into the attachment hole such that it adopts its second, attachment position in which the shape of the fastener prevents the fastener from detachment from the hole. This may for example be achieved by inserting a fastener having a quadratic shape into a quadratic hole and turning the fastener one eighth of a complete circle, i.e. turning the fastener 45 degrees. If the attachment hole and the attachment portion of the fastener have corresponding oblong, e.g. rectangular shapes, the fastener may be also turned 90 degrees, i.e. a quarter of a complete circle, to attain its attachment position. Another possible shape may be a circular shaped central part having one, preferably at least two, extensions protruding from the central circle, e.g. the circular central part may have two arch shaped extensions opposite to each other.

The fastener may be provided with snap-in means, which may interact with locking structures which either is a (non-rotating) part of the fastener itself or with a part of the air bag curtain or an intermediate connection between the airbag curtain and the fastener. The snap-in means are adapted to interact with locking means such that they will snap-in and rotatably lock the fastener in its second, attachment position when the fastener is inserted in the mounting hole and rotated to change its position from the first, insertion position to the second, attachment position.

The invention further relates to an airbag curtain fastening system for fastening of an airbag curtain to a body frame or the like of a vehicle. The fastening system comprises a multitude of fasteners as herein described adapted to be fitted into mounting holes.

The invention also relates to the use such a fastener as herein described for the attachment of an airbag curtain to a mounting hole in a vehicle part. The use is particularly suitable for preventing damage to a thin metal plate, e.g. a plate thinner than 2 mm or even more useful when the plate is thinner than 1 mm.

EMBODIMENT(S) OF THE INVENTION

Figure 1:
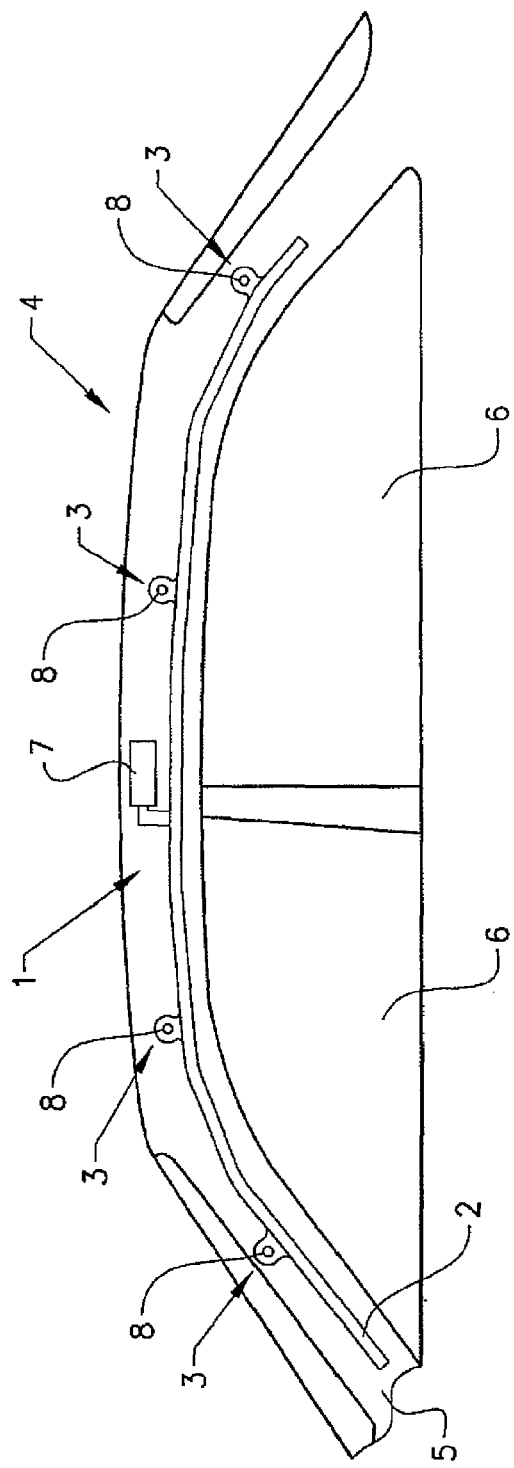
FIG. 1 An airbag curtain mounted in a car
FIG. 2 An isometric view of a fastener
FIG. 3 A side view of a fastener
FIG. 4 A cross sectional view along line B-B in FIG. 3, i.e. an axial cross sectional view along the axial axis of the fastener
FIG. 5 The same cross sectional view of the fastener as in FIG. 4 when the fastener is mounted in a mounting hole.

In FIG. 1, it is exemplified how a curtain airbag 1, comprising a main body portion 2 and airbag-anchor portions 3, may be mounted to a car 4. The curtain airbag 1 is intended to protect an occupant of the car 4, and is attached to an interior member, such as a body frame 5, of a car 4 on the upper side of front and rear door windows 6. In a collision, the airbag 2 is activated to suddenly expand, i.e. rapidly deploy, downward along the door windows 6 in response to gas spouting from a compressed gas source, so-called inflator 7, so as to protect the head and body of the occupant. The airbag-anchor portions 3 are fixed to a body panel of an automobile, such as the body frame 5, at a plurality of preformed mounting holes 8 located at the positions of the airbag anchor portions 3 above the windows 6. The main airbag body 2 is normally folded in a compact size and disposed at a fixed position above the door windows 6.

In FIG. 2, an isometric view of a fastener 9 for fastening of an airbag curtain to a car is shown. The fastener 9 comprises an attachment portion 10 intended to be inserted into a mounting hole, and a head portion 11 intended to secure the attachment of the airbag curtain 1 to the car 2 (see FIG. 1). The head portion 11 may have a number of different shapes so as to assure a reliable connection to airbag-anchor portions (see FIG. 1, reference number 3) or any intermediate connecting device intended to be used as a connecting link between the curtain airbag and the fastener.

In FIG. 3 is shown a side view of the fastener 9. In this view is it shown that the attachment portion 10 is connected to the head portion 11 by a thinner, interconnecting section 12. As will be discussed further on below, the interconnecting section 12 may have different shapes and geometry depending on how the fastener 9 is intended to be secured to the attachment hole. In the present example, the fastener 9 is intended to be secured to the hole by turning or rotation of the fastener. In this case it will be necessary to make the interconnecting section 12 thinner (having a smaller radial cross sectional area) than the attachment portion 10 and/or adapt the geometry of this part of the fastener provided that the attachment portion 10 has a shape and size adapted to closely fit into the hole and the mounting hole has a shape not allowing the fastener 9 to be rotated during insertion of the fastener when the edges of the attachment hole is in contact with the attachment portion 10. This may be the case when the shape of the attachment portion and the hole for example are quadratic or rectangular. A common size and shape of the mounting holes is for example a rectangular hole having sides of 7×9 mm.

In FIG. 4 is shown a cross sectional view along the central, longitudinal axis (line B-B) of the fastener in FIG. 3. In FIG. 4 is it visualized the load bearing structure 13 and the energy absorbing structure 14. In this case has the load bearing structure 13 a head portion 16 with a rather large head which serves both the purposes of preventing the fastener 9 from being inserted completely into a mounting hole and also as an attachment point for the airbag curtain. The cross sectional view of the attachment portion 10 of the load bearing structure 13 is essentially T-shaped, hence corresponding to a "mushroom"-shaped three dimensional shape having a stem 15 and a hat 17 wherein the stem part 15 is connected to the head portion 16 and the "mushroom" hat 17 forms the distal end (relative the head portion 11 of the fastener) of the fastener 9. The purpose of having this shape of the load bearing structure 13 is that the end part (distal end "mushroom" hat 17) forms a stop which prevents the fastener 9 from sliding out of the hole.

Hence, the load bearing structure 13 may in this case be described to include three parts, an interconnecting part shaped as a pin 15 provided with a first enlarged head portion 16 serving as an attachment point for an airbag curtain and a second, enlarged head portion 17 at the other end of the pin (the distal end of the attachment portion 10) which serves as a definite stop preventing the fastener 9 to be detached from a mounting hole when an airbag curtain attached, to the fastener, is activated and the forces from the airbag curtain strives to withdraw the fastener from the attachment hole.

The energy absorbing structure 14 is shaped as a shell or cover surrounding the pin portion 15 of the load bearing structure 13. The shape of the energy absorbing structure may of course be different. However, as a general rule, the main part of the energy absorbing structure 14 is a part of the attachment portion 10 of the fastener 9 since the main purpose of the energy absorbing structure is to absorb energy while deforming when the fastener 9 is moving outwards, i.e. to the right in FIG. 5, and it is thus the part of the energy absorbing structure in the attachment portion 10 which will absorb energy during this movement of the fastener. However, there may be forces in all direction at the activation of the air bag curtain and it is preferred that the energy absorbing structure may absorb smaller amounts of energy from forces working in any direction.

In FIG. 5 is shown a fastener 9 located in an attachment hole (mounting hole) 8. When an airbag curtain, mounted and attached to the head portion 11 of the fastener 9, is activated, the forces from the airbag curtain will strive to pull the fastener 9 in an outwards direction, i.e. in a direction towards left in FIG. 5. When the forces directed towards right will work on the fastener, the energy absorbing structure 14 will be deformed or collapsed during a movement towards right due to interaction with the edges 18 of the mounting hole 8 and the energy absorbing structure will thus absorb energy such that there will less damage on the mounting hole 8 and less risk of detachment of the fastener 9. When the fastener has moved to the right a certain distance, the enlarged, distal end portion 17 be in contact with the hole 8. The energy absorbed by the energy absorbing structure 14 will reduce the power of this impact and the large peak forces from the activation of the airbag curtain will be reduced such that the risk of a breakthrough of the fastener through the mounting hole is reduced.

Figure 6:
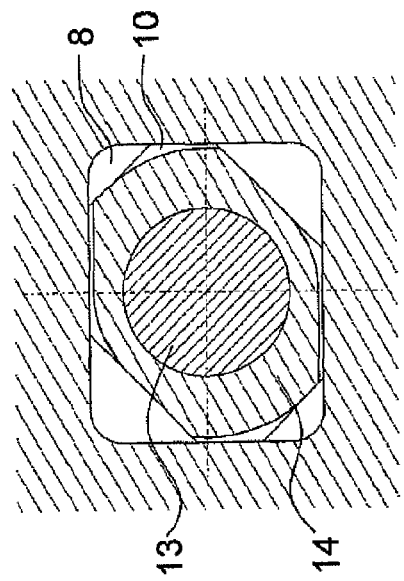
FIG. 6 A radial cross section of a fastener in level with the mounting hole when it is in its insertion position
FIG. 7 A radial cross section of a fastener in level with the mounting hole when it is in its attachment position
FIG. 8 A radial cross section of a fastener provided with rotational locking means when it is in its insertion position
FIG. 9 A radial cross section of a fastener provided with rotational locking means when it is in its attachment position
FIG. 10 An isometric view of a fastener according to a second embodiment of the invention
FIG. 11 An axial cross sectional view along the axial axis of the fastener according to the second embodiment
FIG. 12 An isometric view of the fastener according to the second embodiment when it is in its attachment position in a mounting hole
FIG. 13 An isometric view of the fastener according to the second embodiment when it is in its insertion position in a mounting hole
Figure 7:
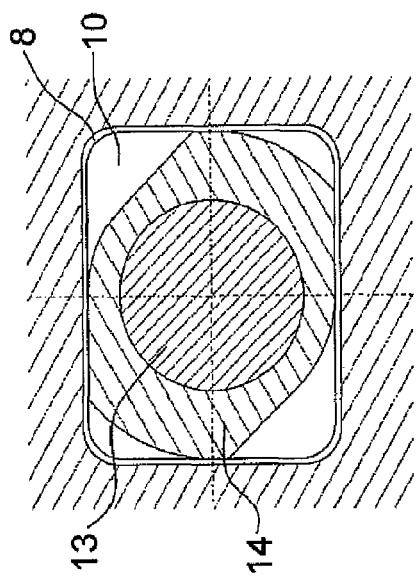

In FIGS. 6 and 7 is radial cross sectional view (a cross section perpendicular to the axial extension) of a fastener 9 when inserted into a mounting hole 8. The cross sectional view is made in level with the mounting hole, i.e. at the interconnecting section 12 between the head portion 11 and the attachment potion 10 of the fastener 9 which is adapted to be able to rotate in the attachment hole 8. FIGS. 6 and 7 discloses cross sectional views of the load bearing structure 13 and the energy absorbing structure 14. Beyond the cross sectional view of the interconnecting section 12 adapted to rotate is the attachment portion 10 seen having essentially the same shape as the contour of the hole 8 but somewhat smaller in order to fit into the hole. In FIG. 6 are the edges of the attachment portion 10 following the contour of the mounting hole 8 all the way. FIG. 6 shows when the fastener is in a first, insertion position (before rotation) and FIG. 7 shows the fastener when it is in a second, attachment position. As may be easily seen, the fastener 9 may be introduced into the hole when it is positioned in its first, insertion position. When the fastener 9 is inserted enough distance, the interconnecting section 12 adapted to be able to rotate in the hole 8 is leveled with the edges of the hole 8 and may thus be rotated. The fastener 9 is thus rotated, e.g. 45 degrees so as to achieve the configuration relatively the hole as shown in FIG. 7. In this position, the fastener may not be withdrawn from the hole 8 since the edges of the hole 8 will lock the attachment portion 10 from withdrawing the fastener. Hence, the attachment portion has a geometry interacting with the geometry of the hole allowing it to fit into and be inserted into the mounting hole when positioned in a first, insertion position and preventing withdrawal of the fastener when rotated to adapt a second, attachment position wherein the geometry of the hole and the attachment portion interact.

Figure 8:
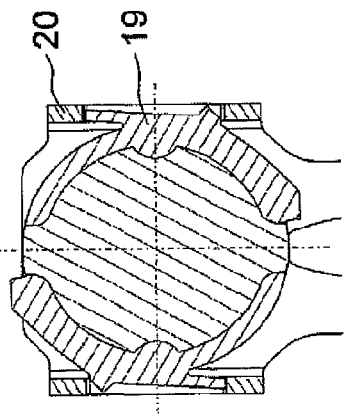
Figure 9:
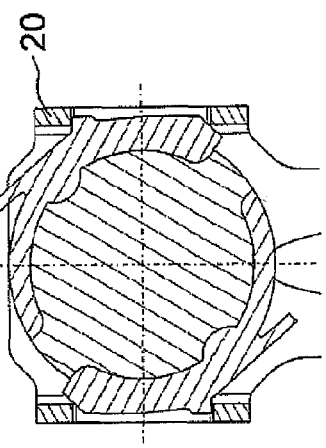

In FIGS. 8 and 9 is shown a radial cross sectional view of a fastener 9 showing a way of rotatably locking the fastener 9 in its second, attachment position (FIG. 9) when the fastener is rotated to change position from its first, insertion position (FIG. 8). The fastener is provided with snap-in means 19 which is adapted to interact with locking means 20. The locking means 20 may be a part of the attachment means of the airbag curtain but could also be a part of some other feature, e.g. a detail of the mounting hole 8 or a some kind of casing or the like for the fastener which is adapted to not rotate when the fastener is inserted in the mounting hole. In this case, the snap in means 19 will interact with the locking means 20 such that there will be a lock which prevent the fastener from being rotated when the fastener 9 as shown in FIG. 8 is rotated about 45 degrees clockwise so as to be in the position described in FIG. 9.

Figure 11:
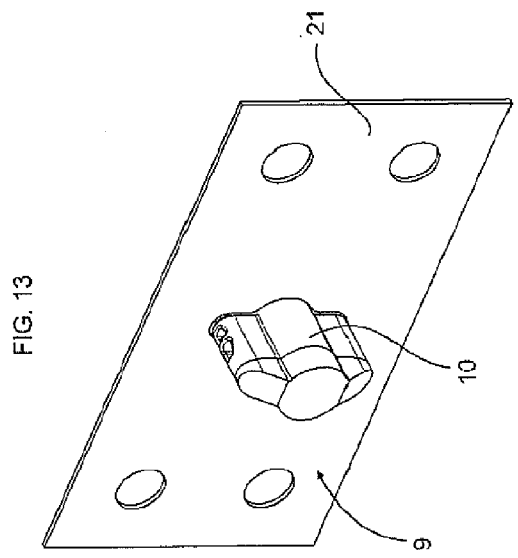
Figure 13:
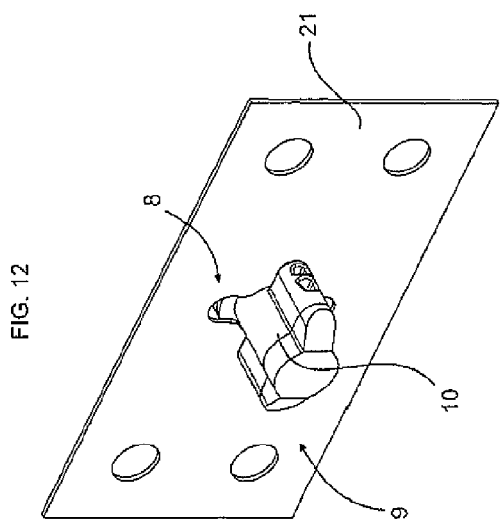
Figure 10:
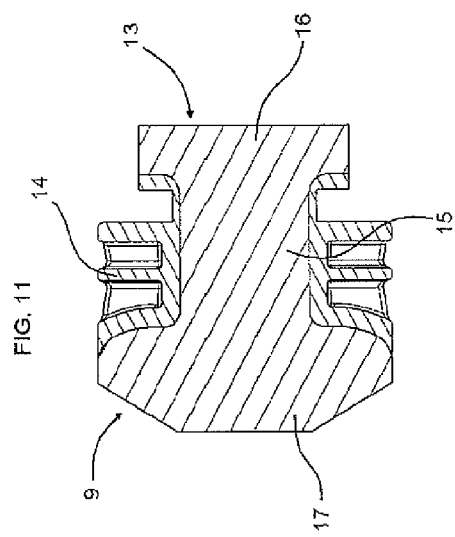
Figure 12:
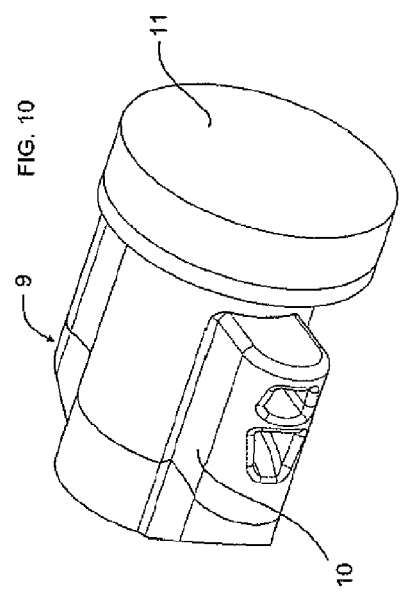

In FIGS. 10-13 is a second embodiment of the fastener 9 shown. In FIG. 10 is shown an isometric view of the fastener. While the head portion 11 essentially have the same shape as the fastener according to the first embodiment, the attachment portion 10 is shaped quite different. The attachment portion 10 is in this embodiment shaped having a central circular part which is provided with two arch shaped extensions located opposite to each other. The fastener is preferably inserted in a hole 8 having a corresponding shape (see FIG. 13) and may be turned 90 degrees to adapt its attachment position (see FIG. 12). In the cross sectional view in FIG. 11 is it shown that the basic structure of the fastener 9 of the second embodiment is essentially the same as for the first embodiment. Hence, the load bearing structure 13 comprises an interconnecting part shaped as a pin 15 provided with a first enlarged head portion 16 serving as an attachment point for an airbag curtain and a second, enlarged head portion 17 at the other end of the pin (the distal end of the attachment portion 10 of the fastener 9) which serves as a definite stop preventing the fastener 9 to be detached from a mounting hole when an airbag curtain is activated. The benefit of using the fastener 9 of the second embodiment instead of the fastener according to the first embodiment is that more energy absorbing structure 14 may be located between the plate 21 of the mounting hole 8 (see FIG. 12) and the enlarged head portion 17 at the distal end of the attachment portion 10. As is evident from the FIGS. 12 and 13, the complete parts of the arch shaped extensions of the attachment portion 10 By using more energy absorbing structure 14 to be squeezed between a larger area of the plate 21 and the enlarged head portion 17 of the load bearing structure 13 in the second embodiment, it will be possible to absorb more energy when the air bag curtain is activated. This will lead to less stress on the plate and thus less risk for a break through of the fastener 9 through the plate.

The invention is herein exemplified by only two embodiments of the fastener, one adapted for a rectangular shape slightly deviating from a quadratic form and another one having a central circular part provided with two arch shaped extensions opposite to each other. However, it is obvious to the skilled person in the art to make fasteners and holes of other shapes as well which are within the inventive idea. Likewise, there are a few examples of materials exemplified for the load bearing structure and the energy absorbing structure and it would also in this case be easy for the skilled person in the art to use other known materials depending on the specific shapes, forces and circumstances during which the fastener is to be used.

The invention claimed is:

1. A device, comprising:
a fastener for fastening an airbag curtain to a vehicle by fixing the fastener to a mounting hole in a body frame of the vehicle, said fastener comprising an attachment portion adapted to be inserted into the mounting hole and a head portion securing an attachment of the airbag curtain to the fastener, wherein said fastener comprises a first load bearing structure adapted to maintain its shape when the airbag curtain is activated and a second energy absorbing structure adapted to deform when the airbag curtain is activated, and wherein a distal portion of the first load bearing structure has a first maximum outer diameter normal to the longitudinal axis of the first load bearing structure, and wherein the second energy absorbing structure has a second maximum outer diameter normal to the longitudinal axis of the first load bearing structure that is no greater than about that of the first maximum outer diameter, wherein said attachment portion adapted to be inserted into the mounting hole has a geometry allowing the attachment portion to fit into and be inserted into the mounting hole when positioned in a first, insertion position and said attachment portion having a geometry which allows the fastener to be rotated when inserted into the mounting hole to second, attachment position in which the attachment portion is prevented from being able to be withdrawn out of the attachment hole.

2. A fastener according to claim 1, wherein the first material used for the load bearing structure has a modulus of elasticity which is at least 10 times higher than the modulus of elasticity of the material used for the second energy absorbing structure when tested according to ISO 527.

3. A fastener according to claim 1, wherein the first material comprises a metal and the second material comprises a polymer or plastic material.

4. A fastener according to claim 1, wherein said load bearing structure forms a core structure along the longitudinal axis of the fastener which at least partially is surrounded by a shell structure forming part of the energy absorbing.

5. An airbag curtain fastening system for fastening of an airbag curtain to a body frame of a vehicle, wherein said system comprises a device including:

a fastener for fastening an airbag curtain to a vehicle by fixing the fastener to a mounting hole in a body frame of the vehicle, said fastener comprising an attachment portion adapted to be inserted into the mounting hole and a head portion securing an attachment of the airbag curtain to the fastener, wherein said fastener comprises a first load bearing structure adapted to maintain its shape when the airbag curtain is activated and a second energy absorbing structure adapted to deform when the airbag curtain is activated, and wherein a distal portion of the first load bearing structure has a first maximum outer diameter normal to the longitudinal axis of the first load bearing structure, and wherein the second energy absorbing structure has a second maximum outer diameter normal to the longitudinal axis of the first load bearing structure that is no greater than about that of the first maximum outer diameter, wherein the body frame includes a hole having a minimum inner diameter, and wherein the first maximum outer diameter is larger than the minimum inner diameter of the hole, and wherein the fastener is located in the hole such that the portion of the fastener having the first maximum outer diameter has passed through the portion of the hole having the minimum inner diameter.

6. The airbag curtain fastening system of claim 5, wherein:
the second energy absorbing structure has a second minimum outer diameter normal to the longitudinal axis of the first load bearing structure that is no greater than about that of the first maximum outer diameter.

7. An airbag curtain fastening system for fastening of an airbag curtain to a body frame an vehicle, wherein said system comprises a device including:

a fastener for fastening an airbag curtain to a vehicle by fixing the fastener to a mounting hole in a body frame of the vehicle, said fastener comprising an attachment portion to be inserted into the mounting hole and a head portion securing the attachment of the airbag curtain to the fastener, wherein said fastener comprises a first load bearing structure adapted to maintain its shape when the airbag curtain is activated and a second energy absorbing structure adapted to deform when the airbag curtain is activated, and wherein a distal portion of the first load bearing structure has a first maximum outer diameter normal to the longitudinal axis of the first load bearing structure, and wherein the second energy absorbing structure has a second minimum outer diameter normal to the longitudinal axis of the first load bearing structure that is less than the first maximum outer diameter, wherein the body frame includes a hole having a minimum inner diameter, and wherein the first maximum outer diameter is larger than the minimum inner diameter of the hole, and wherein the fastener is located in the hole such that the portion of the fastener having the first maximum outer diameter has passed through the portion of the hole having the minimum inner diameter.

8. A fastener for fastening an airbag curtain to a vehicle by fixing the fastener to a mounting hole in a body frame of the vehicle, said fastener comprising an attachment portion to be inserted into the mounting hole and a head portion securing the attachment of the airbag curtain to the fastener characterized in that said fastener comprises a first load bearing structure adapted to maintain its shape when the airbag curtain is activated and a second energy absorbing structure adapted to deform when the airbag curtain is activated and remain at least in part on an opposite side of the mounting hole relative to the head portion after deformation of the second energy absorbing structure due to the activation of the airbag curtain, wherein the attachment portion includes a portion of the first load bearing structure, and wherein a maximum diameter of the first load bearing structure of the attachment portion is greater than a minimum diameter of the mounting hole, wherein said attachment portion adapted to be inserted into the mounting hole has a geometry allowing the attachment portion to fit into and be inserted into the mounting hole when positioned in a first, insertion position and said attachment portion having a geometry which allows the fastener to be rotated when inserted into the mounting hole to second, attachment position in which the attachment portion is prevented from being able to be withdrawn out of the attachment hole.

9. A fastener according to claim 8, characterized in that the first load bearing structure of the fastener is made of a first material and the second energy absorbing structure of the fastener is made of a second material different from the first material.

10. A fastener according to claim 9, characterized in that the first material used for the load bearing structure has a modulus of elasticity which is at 10 times higher than the modulus of elasticity of the material used for the second energy absorbing structure when tested according to ISO 527.

11. A fastener according to claim 10, characterized in that the first material comprises a metal and that the second material comprises a polymer or plastic material.

12. A fastener according to claim 10, characterized in that said load bearing structure forms a core structure along the longitudinal axis of the fastener which at least partially is surrounded by a shell structure forming part of the energy absorbing structure.

13. A fastener according to claim 10, characterized in that said load bearing structure comprises a first enlarged head portion forming part of the fastener's head portion, a second enlarged head portion forming part of the fastener's attachment portion and located at the distal end of the attachment portion relatively the fastener's head portion and a interconnecting part connecting the first and second enlarged head portions of the load bearing structure.

14. An airbag curtain fastening system for fastening of an airbag curtain to a body frame of an vehicle, characterized in that said system comprises a fastener according to claim 10.

15. A fastener according to claim 8, characterized in that the fastener is provided with snap-in means, said snap-in means adapted to snap-in and rotatably lock the fastener in its second, attachment position when the fastener is inserted in the mounting hole and rotated to change its position from the first, insertion position to the second, attachment position.

16. An airbag curtain fastening system, comprising:
   an airbag curtain;
   a body frame of a vehicle, the body frame including a mounting hole; and
   a fastener fastening the airbag curtain to the body frame of the vehicle by fixing the fastener to the mounting hole in the body frame of the vehicle, said fastener comprising an attachment portion inserted into the mounting hole and a head portion securing the attachment of the airbag curtain to the fastener characterized in that said fastener comprises a first load bearing structure adapted to maintain its shape when the airbag curtain is activated and a second energy absorbing structure adapted to deform when the airbag curtain is activated and remain at least in part on an opposite side of the mounting hole relative to the head portion after deformation of the second energy absorbing structure due to the activation of the airbag curtain, wherein the attachment portion includes a portion of the first load bearing structure, and wherein a maximum diameter of the first load bearing structure of the attachment portion is greater than a minimum diameter of the mounting hole, and wherein the fastener is configured such that the second energy absorbing structure is rotationally fixed relative to the first load bearing structure, and wherein the second energy absorbing structure at least substantially spans a distance from one side of the mounting hole to another side of the mounting hole, wherein the distance lies on a plane that is parallel to and lying on a longitudinal axis of the fastener.

* * * * *